Figures 9, 12:
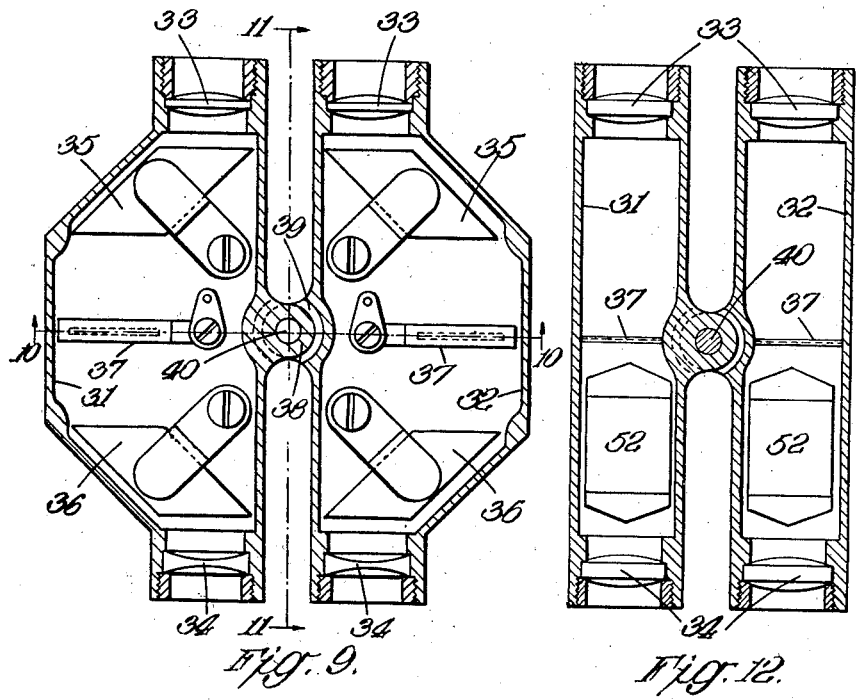

April 20, 1943.   L. M. HILTON ET AL   2,317,059
SIGHTING APPARATUS FOR USE ON AIRCRAFT AND FOR LIKE PURPOSES
Filed March 28, 1940   6 Sheets-Sheet 1
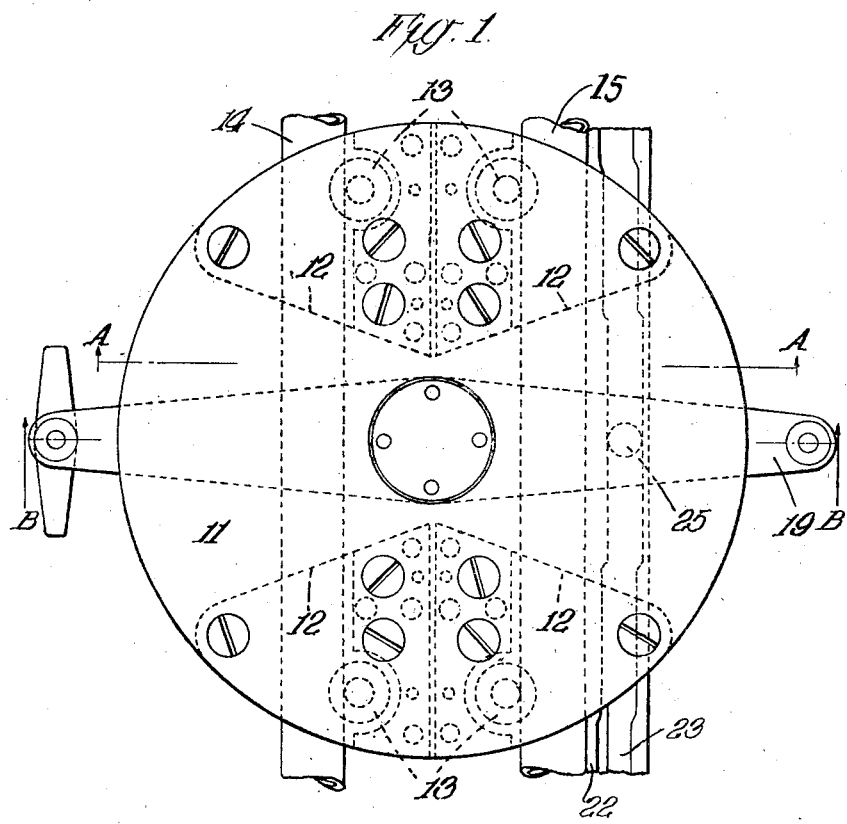
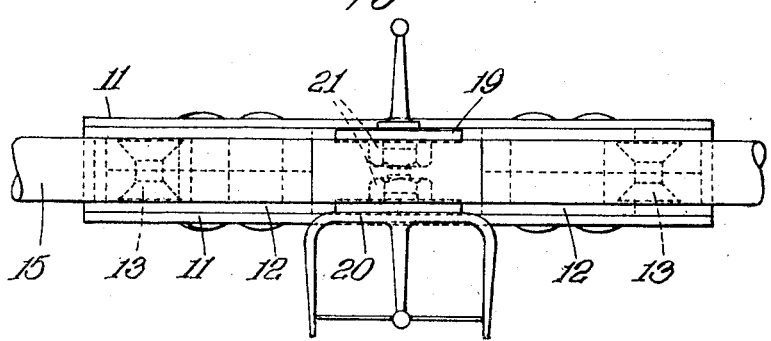
INVENTORS
LOUIS MASSEY HILTON,
JOHN HETHERINGTON,
BY Bailey & Parson
ATTORNEYS April 20, 1943.   L. M. HILTON ET AL   2,317,059
SIGHTING APPARATUS FOR USE ON AIRCRAFT AND FOR LIKE PURPOSES
Filed March 28, 1940   6 Sheets-Sheet 2
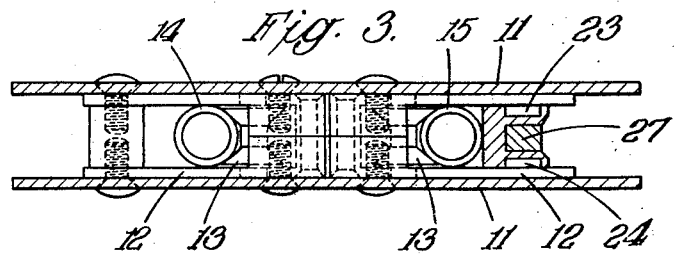
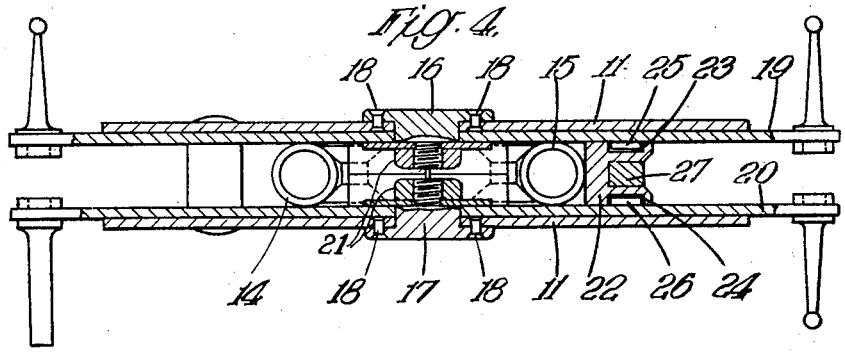
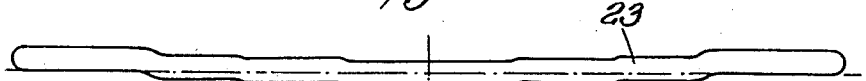
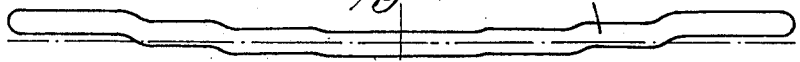
INVENTOR
LOUIS MASSEY HILTON,
JOHN HETHERINGTON,
BY Bailey & Pearson
ATTORNEYS

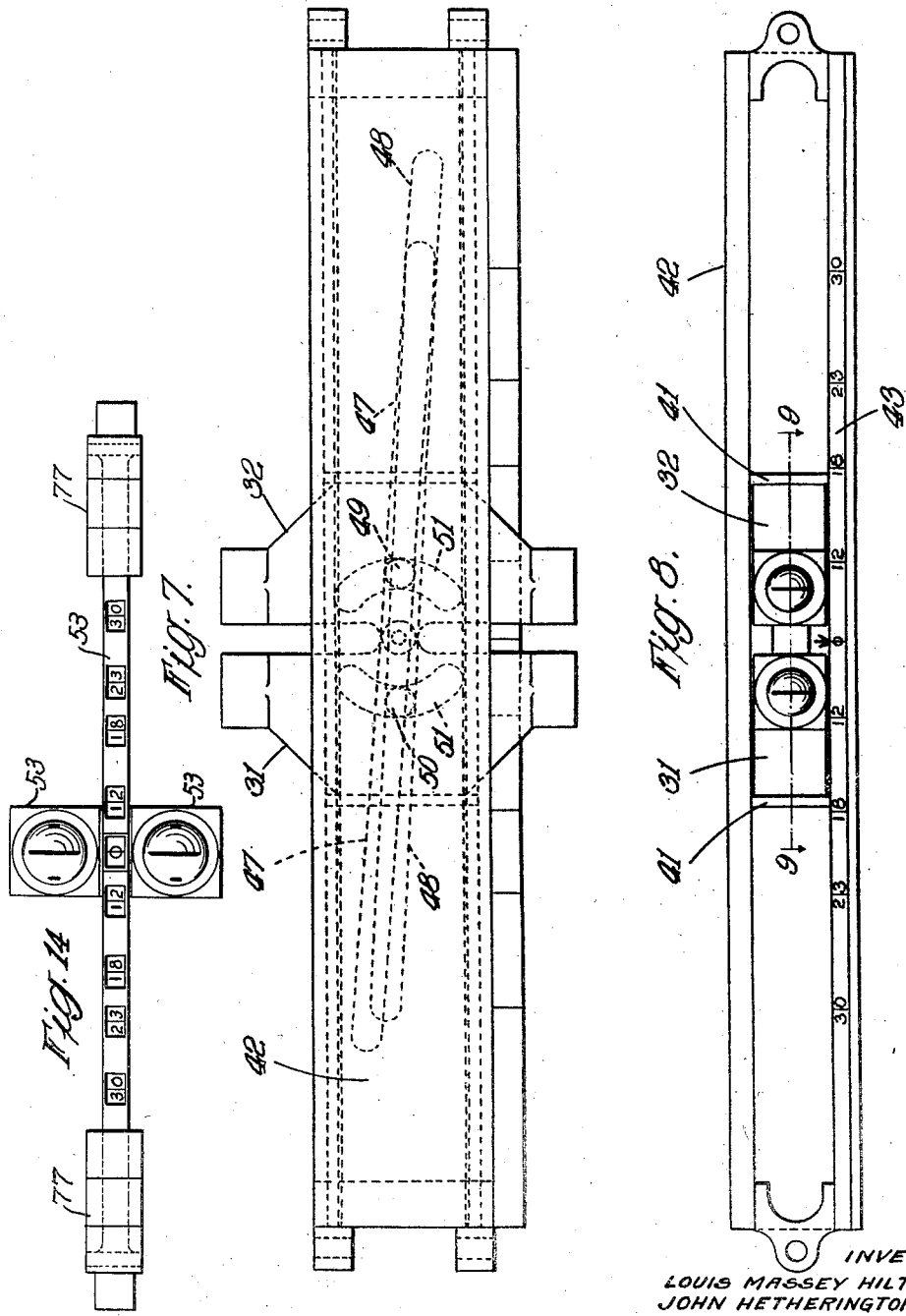

April 20, 1943.   L. M. HILTON ET AL   2,317,059
SIGHTING APPARATUS FOR USE ON AIRCRAFT AND FOR LIKE PURPOSES
Filed March 28, 1940   6 Sheets-Sheet 4

INVENTORS
LOUIS MASSEY HILTON,
JOHN HETHERINGTON,
BY Bailey & Parson
ATTORNEYS

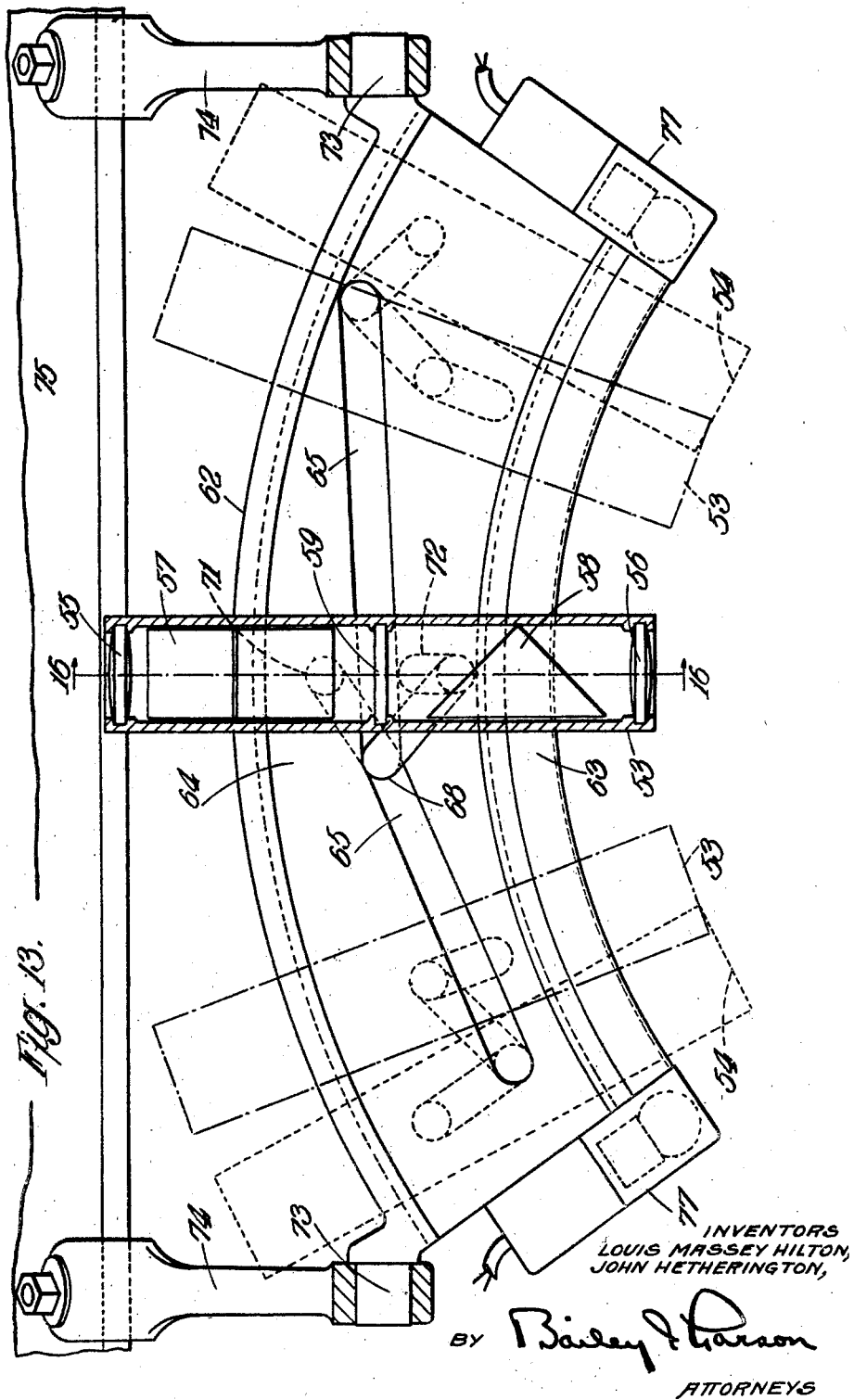

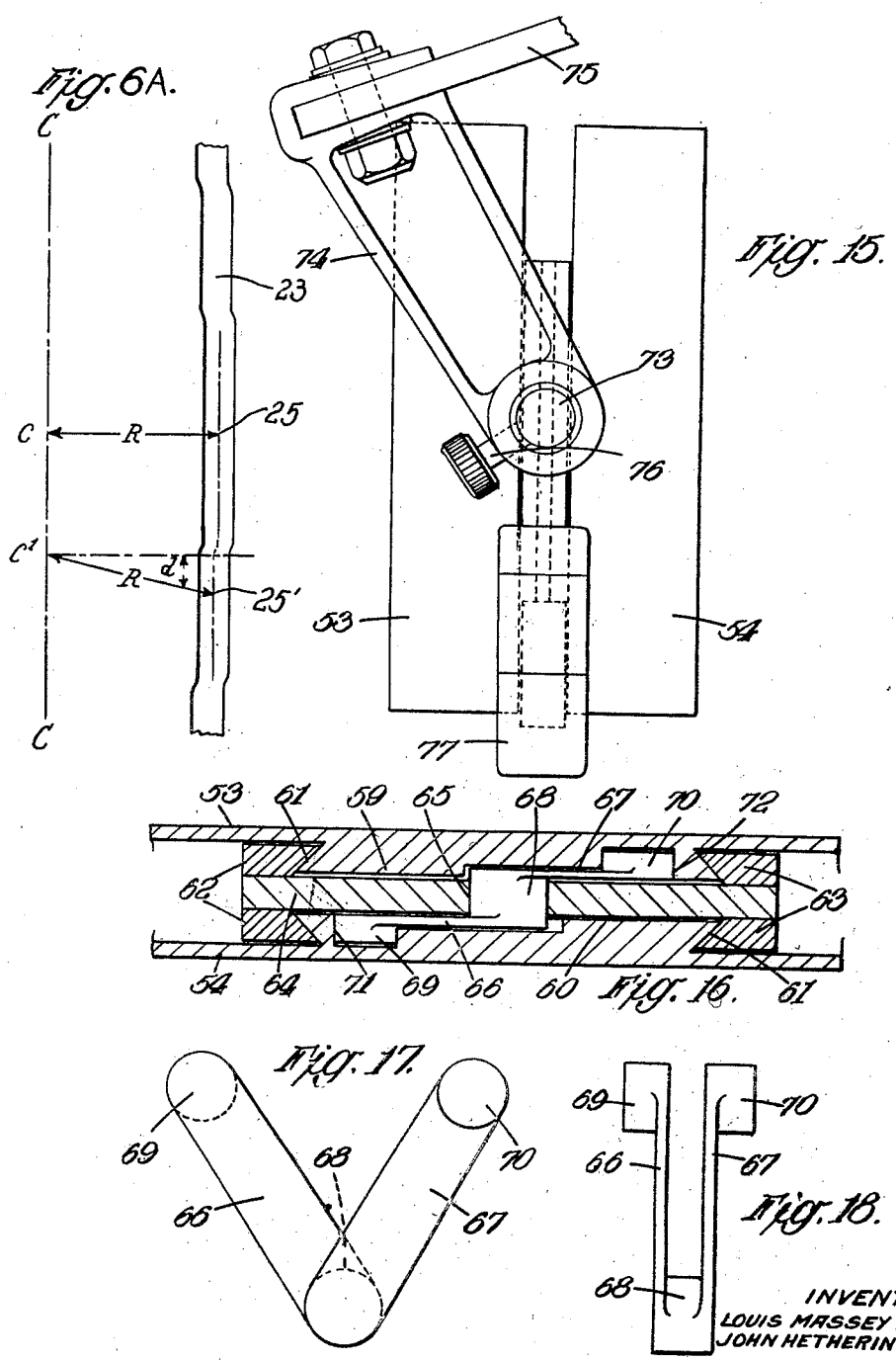

Patented Apr. 20, 1943

2,317,059

UNITED STATES PATENT OFFICE 2,317,059

SIGHTING APPARATUS FOR USE ON AIRCRAFT AND FOR LIKE PURPOSES

Louis Massey Hilton, Stanmore, and John Hetherington, West Ealing, London, England, assignors to The Fairey Aviation Company Limited, Hayes, Middlesex, England Application March 28, 1940, Serial No. 326,538
In Great Britain May 24, 1938

6 Claims. (Cl. 33—46)

This invention relates to sighting apparatus for use on aircraft or for like purposes where it is required that the line of sight shall be inclined to the line of fire to make allowance for movement of the target during the run of a torpedo towards its objective, the effect of wind on a projectile or like variation.

In the case of a torpedo attack on a battleship the chances of being struck are reduced if the battleship be turned towards, or away from, an approaching torpedo and similarly a battleship may be turned towards, or away from, an approaching hostile aircraft with a view of avoiding projectiles discharged therefrom. The object of the present invention is to provide an improved sighting device whereby allowance may be made for such manoeuvring of the target.

To this end and in accordance with the present invention two sighting devices are coupled in such manner that the setting of the one produces automatically a proportional setting of the other, such differential setting corresponding with the different angle of attack necessitated by the avoidance movement of the target.

By these means the one sighting device may be set at the angle required to allow for the speed of the moving target, while the other sighting device is set automatically at a smaller angle to allow for the variation of position of the target due to the avoidance turning thereof. Hence if the attacking aircraft be held on its proper course relatively to the target by means of the one sighting device the alteration of course necessitated by the avoidance movement of the target may be effected by bringing the other sighting device on to the target.

The two sighting devices may be pivotally mounted on a carriage and adapted, on movement of said carriage, to cooperate respectively with relatively fixed parts which by cam action cause said sighting devices to turn about a common pivotal axis, but to different angular extents.

For example the carriage may have imparted thereto a rectilinear movement along a suitable guideway and the sighting devices may have rollers movable in cam grooves in parts carried by said guideway which also carries a scale relatively to which the sighting devices are set.

In a modification of the invention the two sighting devices are in the form of casings in which are arranged prismatic optical systems, said casings being arranged side by side or the one above the other, and pivoted relatively to one another. These optical systems may each comprise object and eye lenses, total reflection prisms and a graticulated screen, while prisms, lenses or a simple Galileo system may be included for erecting the image.

The invention will now be described with reference to the accompanying drawings of which Figures 1 and 2 are respectively a plan and an elevation of sighting apparatus in accordance with one form of the invention, Figures 3 and 4 are sections on the lines A—A and B—B of Figure 1, while Figures 5 and 6 are diagrams illustrating the profiles of cam grooves in the sighting apparatus. Fig. 6A is a diagrammatic view of several positions of operation of the device.

Figure 10:
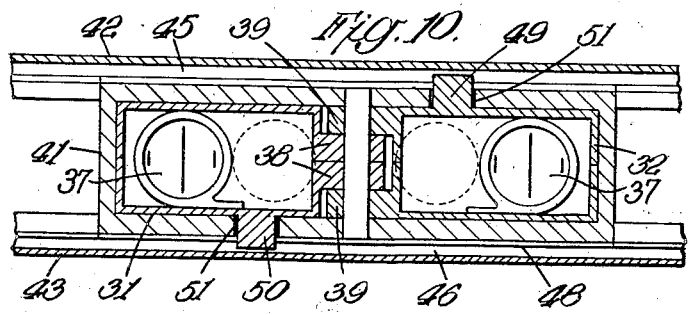
Figure 11:
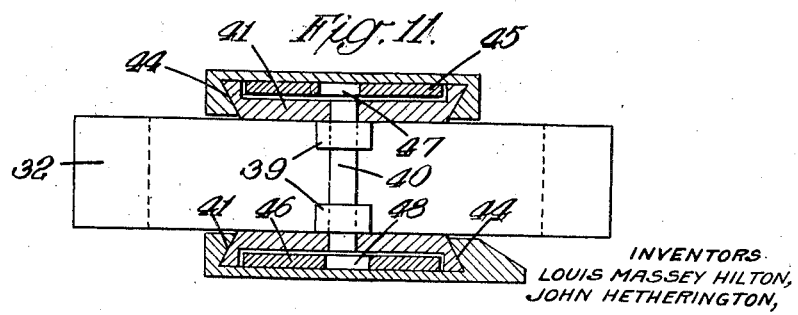

Figures 7 and 8 are respectively a plan and an elevation of sighting apparatus in accordance with a modified form of the invention; Figure 9 is a fragmentary sectional plan on the line 9—9, Figure 8; Figures 10 and 11 are respectively sections on the lines 10—10 and 11—11, Figure 9; Figure 12 is a section corresponding with Figure 9, but showing a compound prism optical system; Figures 13 and 14 are respectively a sectional plan and an elevation of sighting apparatus in accordance with a still further modified form of the invention; Figure 15 is an end view of the sighting apparatus shown in Figure 13, as seen from the right; Figure 16 is an enlarged fragmentary sectional view on the line 16—16, Figure 13; and Figures 17 and 18 are respectively a plan and a side view of a detail to the same scale as Figure 16.

As shown in Figures 1 to 6 of the drawings the sighting apparatus has two circular plates 11, 11 which are secured to, and held in spaced relationship by, spacer pieces 12, of channel section. Between the limbs of each spacer piece 12 there is mounted a peripherally grooved roller 13, and said rollers 13 bear oppositely against guide bars 14 and 15 suitably supported transversely of the aircraft or the like, so that the sighting apparatus may be caused readily to slide along the guide bars 14, 15. At their centres the plates 11 and 12 are apertured to give passage to bosses 16 and 17, respectively, which are secured to the plates 11 by rivets 18. Sighting bars 19 and 20 (20 being the normal sighting bar and 19 the avoidance sighting bar) are rotatably mounted on the bosses 16 and 17 and are held in position thereon by nuts 21. Secured to the guide bar 15, for example by clips (not shown), is a bar 22 in the upper and lower surfaces of which cam tracks 23 and 24 are formed. The sighting bar 19 carries, upon its under side, a roller 25 which projects into the cam track 23 and the sighting bar 20 carries, upon its upper side a similar roller 26 which projects into the cam track 24. The shape of the cam tracks is clearly shown in Figures 5 and 6, of which Figure 5 illustrates the shape of the upper or avoidance cam track 23 and Figure 6 the shape of the lower or normal cam track 24.

As shown in Figures 5 and 6 each cam track 23, 24 comprises a series of straight portions leading one into another, the amount by which each straight portion is offset in relation to its neighbour determining the angle through which the appropriate sighting bar is caused to travel when the apparatus is moved along the guide bars 14, 15, while the differences between the tracks 23, 24, themselves produce the differential angular movement of the sighting bars 19, 20.

For example, assuming the horizontal and vertical centre lines of the central straight portion of the cam track 23, shown in Figure 5, to be datum lines, the distance from said vertical datum line to the mid point of the step or change between said central straight portion and the next straight portion on each side is 0.856" and the extent by which said next straight portion is offset (i. e. its horizontal centre line is displaced from that of the central straight portion) is 0.005". Similarly, the distance from the vertical datum line to the mid point of the next step or change is 1.885" and the extent of the next offset, measured from the horizontal datum line, is 0.01", while the distance from the vertical datum line to the mid point of the third step or change is 2.768" and the extent of the next offset from the horizontal datum line is 0.04". The steps or changes between adjacent straight portions of the cam tracks are by way of suitably proportioned ogee curves.

In the case of the cam track 24 shown in Figure 6 the corresponding figures are:

| From vertical datum line to mid point of | From horizontal datum line to horizontal centre line of |
|---|---|
| 1st step or change 0.82" | 1st offset portion 0.005" |
| 2nd step or change 1.795" | 2nd offset portion 0.03" |
| 3rd step or change 2.621" | 3rd offset portion 0.07" |

For the sake of convenience this shape is not indicated in Figure 1.

The cam track bar 22 carries a scale 27 (both omitted from Figure 2) consisting of a rod of translucent material let into the bar 22, illuminated from its ends by electric lamp bulbs (not shown) and bearing suitable graduations on its face.

In use the apparatus is moved along the guide bars 14, 15, to the one side or the other of its central or zero position. The resulting co-operation of the rollers 25, 26 with the cam grooves 23, 24, causes the sighting bars 19, 20 to turn about their common vertical axis as at each step of a cam groove the roller therein is caused to move nearer to the vertical plane midway between the guide bars 14 and 15. It is thus possible to set the normal sighting bar 20, at the angle required to allow for the speed of the moving target, by means of the scale 27.

The avoidance sighting bar 19 is thus set automatically at a smaller angle to allow for the variation of the position of the target due to the avoidance turning of the target. Thus if the attacking aircraft be held on its proper course relatively to the target by means of the sighting bar 20, the alteration of course necessitated by the avoidance movement of the target may be effected by bringing the other sighting device 19 on to the target.

As illustrated in Fig. 6A, the line C—C represents the path of the center of the carriage to which the sighting members are pivoted. The reference numeral 23 represents the upper cam groove and the number 25 represents the element engaging in the cam groove. When the carriage is central, the member 19, as represented by line R, extends directly forward. If, however, the carriage is slid to the right to the position C¹, the distance to the cam groove is decreased because of the groove form illustrated in Fig. 5. The length of the member R, of course, remains the same so that it (the member 19 represented by R in this instance) could not possibly extend forwardly. The sighting member must therefore turn to the right, but, of course, to a different degree than that to which the bar 19 has been turned. This movement of the sighting bar 20 sets the lower sight according to whatever corrections must be made according to the estimated speed of the target, etc., as is usual in such sights, but, at the same time, it brings about a different movement of the sighting bar 19 and sets the upper sight in such a position that if, just before the torpedo or other projectile is released, the operator observes that the target is making an avoidance movement, he may move his eye from the lower sight to the upper sight onto the target, when, owing to the different setting of the upper sight, as compared to the lower sight, the torpedo or other projectile will be released so that it will strike the target as it makes its avoidance movement.

It should be manifest from the above, that by means of the invention there is provided a sighting arrangement whereby not only may the aircraft be directed on the assumption that the target will hold on its course (the necessary allowances being made for the estimated speed and range of the target), but it may also be rapidly re-directed if just prior to the release of the torpedo it is observed that the target has commenced to make an avoidance movement. In other words, the improved sight is a dual sight, one part of which may be set to allow for the estimated speed and range of the target, while the other part is set automatically and concurrently therewith but at such an angle in relation to the first part as to compensate for the different position which the target will assume due to the avoidance movement. Hence, immediately the pilot of the aircraft observes that the target is making an avoidance movement, he applies his eye to the second part of the sighting device and re-directs his aircraft before he releases his torpedo.

This sight is designed to cater for requirements which have been found necessary through long experience, that is, when using a 40 knot torpedo against a target ship travelling at 30 knots normal to the path of the attacker, the sight angle will be 28° to the torpedo path, but if the same conditions prevail except that the target attempts an avoidance maneuver, it has been found that this avoidance maneuver averages out into a new sighting angle which, in this case, has been found to be 20°.

The following table gives the statistics which have been proved from experience and from which the ordinates given hereinabove were derived, these ordinates being functions of the tangent of the angles given in the table:

Based upon a torpedo speed of 40 knots

| Target speed | Normal sight angle | Avoidance sight angle |
|---|---|---|
|  | Degrees | Degrees |
| 30 knots | 28 | 21 |
| 23 knots | 20 | 14 |
| 18 knots | 14 | 10 |
| 12 knots | 6 | 5 |
| 0 knots | 0 | 0 |

To operate the sight the speed of the target normal to the path of the attacker is first estimated and then the sight unit is run along the guide rails (which are fixed transversely across the attacking machine) until the sight unit datum coincides with the scaled indication of target speeds on the guide rails. This movement in conjunction with the cams 23 and 24 resulting in the correct angular settings for the respective function of each sight, the upper sight 19 being set for and used only when the target attempts an avoidance movement, this avoidance sighting angle being, as mentioned before, in the nature of a correction. The lower sight arm 20 is used only when the target maintains its course normal to the path of the attacker.

It is to be understood that arrangements other than those mentioned above may be provided for effecting the cam action on the sight bars.

In the form of the invention illustrated by Figures 7 to 11 of the drawings, the two sighting devices are constituted by two similar casings 31, 32 in each of which are arranged object and eye lenses 33 and 34, and total reflection prisms 35 and 36, while a graticulated screen 37 is arranged between the prisms 35 and 36. The casings 31 and 32 are arranged side by side and are pivoted together, substantially centrally of the assemblage, by means of apertured lugs 38, 38 and 39, 39 and a pivot pin 40. The casings 31 and 32 are disposed within, and project beyond, a box like carriage 41 by which the pivot pin 40 is carried and the concurrent bodily movement of the two sighting devices is effected by arranging the carriage 41 between a pair of guide bars 42, 43 situated above and below said carriage and with dovetailed parts of which the edges of the carriage 41 cooperate as at 44, Figure 11. The guide bars 42 and 43 have mounted thereon cam plates 45, 46 to receive which the carriage 41 is recessed at its upper and lower surfaces as shown in Figure 11. The cam plates 45, 46 are formed with cam slots 47, 48 in which engage pins 49, 50 projecting from the casings 32, 31, respectively, and passing through arcuate slots 51 in the carriage 41.

The guide bars 42 and 43 may be arcuate, if desired, with the concave or shorter side towards the observer, the carriage 41 being formed correspondingly.

Figure 12 shows how the shape of the casings 31 and 32 may be altered if compound prisms such as 52 be employed.

In the form of the invention illustrated by Figures 13 to 18, the two sighting devices are arranged the one above the other and consist of two casings 53, 54 in each of which is arranged an optical system comprising object and eye lenses 55, 56 and reversing prisms 57, 58, while a graticulated screen 59 is arranged between the prisms 57 and 58. The two casings 53, 54 are formed with projections 60, 60 dovetailed at their edges to cooperate, as at 61, Figure 16, with correspondingly dovetailed edges of pairs of arcuate guide bars 62, 62 and 63, 63. The guide bars of each pair are mounted on opposite sides of a cam plate 64 with the concave or shorter sides of the guide bars towards the observer and the cam plate 64 is formed with a suitably shaped slot 65. The relative movement between the sighting devices, which takes place automatically when one of said devices (e. g. the normal sighting device in the casing 54) is moved bodily along the guide bars 62, 62 and 63, 63, is effected by means of a V-shaped lever 66, 67 (Figures 16, 17 and 18) the junction of the limbs 66, 67 of which is formed as a journal 68 to move in the cam slot 65, and the free ends of the limbs 66, 67 of which are formed with projecting journals 69, 70, one 69 of which is received in a bearing 71 in the casing 54 of the normal sighting device and the other 70 of which is received in a slotted bearing 72 in the casing 53 of the avoidance sighting device.

The pair of guide bars 62, 62 are formed at their ends as trunnions 73, 73 working in brackets 74, 74 attachable, e. g. to the windscreen 75 of a torpedo-carrying aircraft, one or both of the brackets 74, 74 being provided with a screw, such as 76, Figure 15 to enable the sighting apparatus to be held in an adjusted position about the axis of the trunnions 73, 73. 77, 77, are housings for electric lamps to illuminate a scale at the concave or shorter side of the guide bars 63, 63. The relative positions of the casings 53, 54 and of the lever 66, 67, when moved to the right or left are indicated in broken lines in Figure 13.

We claim:

1. A sighting apparatus for aircraft and the like comprising a support, a first sighting device, a second sighting device, means mounting said first and second sighting devices for angular sighting movement relative to said support and to each other, and means coupling said sighting devices and said support whereby predetermined angular sighting movement of one of said devices relative to said support produces proportional predetermined angular movement of the other of said devices relative to said one device, the first of said devices comprising a sight for normal movement of a target, the second of said devices comprising a sight for avoidance movements of a target.

2. A sighting apparatus for aircraft and the like comprising a support forming a guideway, a carriage mounted on said support for movement along said guideway, a first sight device, a second sighting device, pivot means mounting said devices on said carriage for angular sighting movements about said pivot means, and gearing operatively connecting said devices and said support to move said devices, respectively, different angular distances upon movement of said carriage along said guideway, the difference in the angular movement of said devices corresponding to the difference between the angle of attack against a target moving along a course normal to the path of movement of the aircraft and the angle of attack against a target undergoing avoidance movement from said course.

3. A sighting apparatus for aircraft and the like comprising a support forming a guideway, a carriage mounted on said support for movement along said guideway, a first sighting device, a second sighting device, means mounting said sighting devices on said carriage for angular sighting movement relative to each other and to said carriage about a common pivotal axis, first cam means on said support, second cam means on said support, first and second cam-follower means on said first and second sighting devices, respectively, engaging said first and second cam means to pivot said sighting devices upon movement of said carriage along said guideway, the profile of one of said cam means being different from the profile of the other of said cam means whereby to provide relative angular pivoting between said sighting devices, the difference between said profiles corresponding to the difference between the angle of attack against a target in normal movement, on the one hand, and avoidance movement, on the other hand.

4. A sighting apparatus as claimed in claim 1, said sighting devices comprising casings having prismatic optical systems therein, said casings being mounted side by side.

5. A sighting apparatus as claimed in claim 1, said sighting devices comprising casings having prismatic optical systems therein, said casings being mounted one above the other.

6. A sighting apparatus as claimed in claim 1, said sighting devices comprising substantial identical sights, the means mounting said devices comprising a carriage and pivot means supporting said devices on said carriage, said support comprising arcuate guide bars providing a guideway for said carriage, the means coupling said sighting devices and said support comprising a slotted cam plate fixed to said support, and a cam-follower supported on said carriage and comprising a V-shaped lever, the junction of the arms of said lever being engaged in the slot of said cam plate, the free ends of the arms of said lever engaging said sighting devices, respectively.

LOUIS MASSEY HILTON.
JOHN HETHERINGTON.